(12) United States Patent
Hecht et al.

(10) Patent No.: US 7,311,477 B2
(45) Date of Patent: Dec. 25, 2007

(54) CUTTING INSERT AND CUTTING TOOL

(75) Inventors: Gil Hecht, Nahariya (IL); Oleg Eliezer, Nahariya (IL)

(73) Assignee: Iscar Ltd., Tefen (IL)

( * ) Notice: Subject to any disclaimer, the term of this patent is extended or adjusted under 35 U.S.C. 154(b) by 274 days.

(21) Appl. No.: 11/214,790

(22) Filed: Aug. 31, 2005

(65) Prior Publication Data

US 2006/0056925 A1 Mar. 16, 2006

(30) Foreign Application Priority Data

Sep. 12, 2004 (IL) .................................... 164023

(51) Int. Cl.
*B23D 77/00* (2006.01)
(52) U.S. Cl. ............................ 407/37; 407/45; 407/77; 408/153; 408/179
(58) Field of Classification Search ................. 407/36, 407/37, 48, 87, 103, 46; 408/153, 161, 162, 408/179, 233, 713
See application file for complete search history.

(56) References Cited

U.S. PATENT DOCUMENTS

| 1,941,790 A | | 1/1934 | Davis |
| 3,023,486 A | | 3/1962 | Bogner |
| 4,425,063 A | | 1/1984 | Striegl |
| 4,611,516 A | | 9/1986 | Hochmuth et al. |
| 4,850,757 A | | 7/1989 | Stashko |
| 5,271,442 A | * | 12/1993 | Carpenter et al. ........ 144/220 |
| 5,328,307 A | * | 7/1994 | Fees et al. .................. 408/173 |
| 5,529,439 A | | 6/1996 | Werner et al. |
| 5,567,092 A | * | 10/1996 | Post ............................ 407/38 |
| 6,000,449 A | * | 12/1999 | De Marco .................. 144/219 |
| 6,254,319 B1 | | 7/2001 | Maier et al. |
| 6,918,717 B2 | * | 7/2005 | Ben-Mucha ................ 407/103 |

FOREIGN PATENT DOCUMENTS

| CH | 564 397 A5 | 7/1975 |
| DE | 808 077 C | 7/1951 |
| DE | 197 03 848 A1 | 7/1998 |
| EP | 0 624 415 A | 11/1994 |
| EP | 0 641 617 A | 3/1995 |
| FR | 1 274 017 A | 10/1961 |
| GB | 595 420 A | 12/1947 |
| GB | 702 110 A | 1/1954 |
| JP | 2001 150218 | 2/2001 |

OTHER PUBLICATIONS

International Search Report, PCT/IL2005/000947, dated Feb. 9, 2006.

* cited by examiner

*Primary Examiner*—Monica Carter
*Assistant Examiner*—Sara Addisu
(74) *Attorney, Agent, or Firm*—Womble Carlyle

(57) ABSTRACT

A metal cutting tool is provided with at least one cutting insert mounted in an insert pocket in communication with an adjusting mechanism, the cutting insert comprising at least one insert adjusting slot extending between two opposing major faces thereof and opening out to each major face at an adjusting aperture and the adjusting mechanism comprising at least one adjusting member having an adjusting member top face underlying the cutting insert while being visible and accessible therethrough.

21 Claims, 16 Drawing Sheets

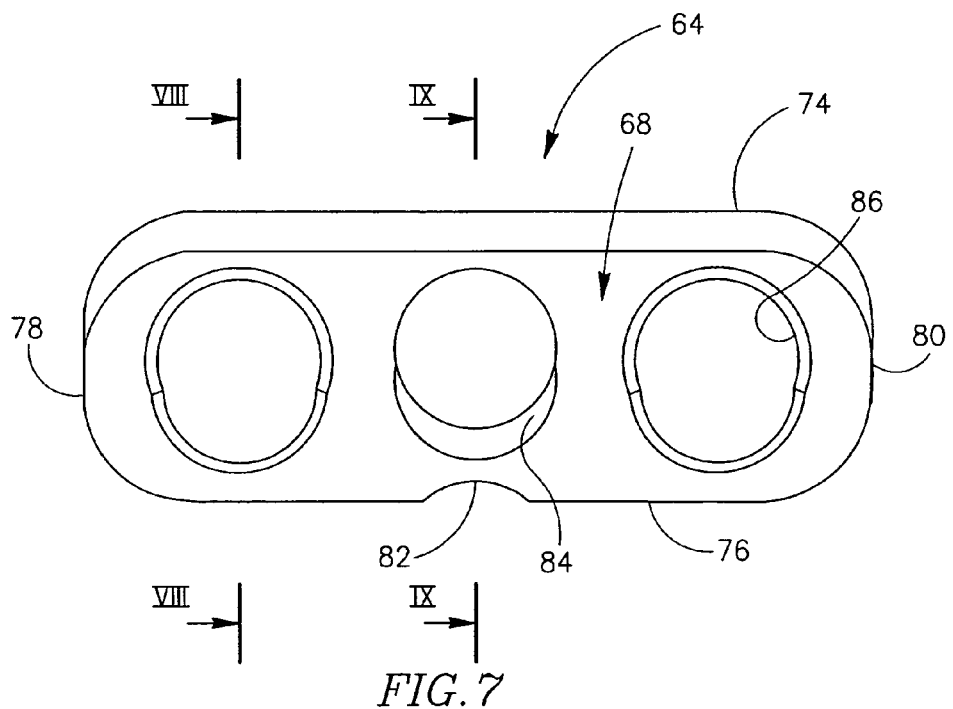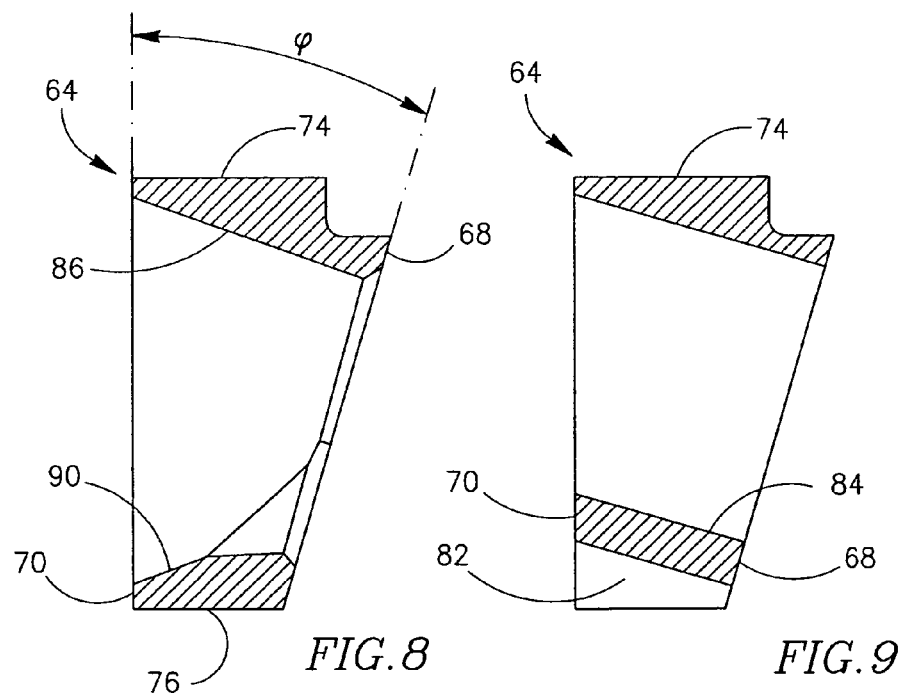
FIG. 7
FIG. 8　　FIG. 9

CUTTING INSERT AND CUTTING TOOL

FIELD OF THE INVENTION

The present invention relates to a metal cutting tool having an adjusting mechanism for adjusting the position of a cutting insert secured in the cutting tool relative thereto, and to a cutting insert for securing in the metal cutting tool, and in particular to a metal cutting tool having a plurality of such cutting inserts mounted on a periphery thereof.

BACKGROUND OF THE INVENTION

Such metal cutting tools require accurate positioning of an operative cutting edge relative to the tool. Precise adjustment of the operative cutting edge position is particularly important for finishing operations. However, adjusting mechanisms require installation space in the tool. Therefore, the adjusting mechanism should preferably be dimensionally compact so as to occupy as little space as possible in the cutting tool. This requirement is especially important in tools used for metal removal inside cavities of the workpiece, such as boring or reaming tools, because the dimensions of the bore limit the maximum diameter of the tool, and thus the space available for installation of the cutting inserts and the adjustment mechanisms in the tool.

U.S. Pat. No. 4,850,757 to Stashko discloses such a reamer comprising a holder having a recess into which a disposable cutting insert is fitted. The insert is held in place by a clamping member which bears against a surface of the insert and which is attached to the holder by a clamping screw. Radial adjustment of the insert can be effected by adjusting screws having camming surfaces which bear against a corresponding camming surface of the insert. However, the insert adjustment and clamping mechanisms occupy considerable space at the working end of the tool.

U.S. Pat. No. 4,425,063 to Striegl discloses a reamer with a flat rectangular reversible cutting bit, possessing a cutting edge extending parallel to a longitudinal axis of a revolvable body. The flat rectangular cutting insert has four indexing positions, and occupies a relatively small space on the revolvable body. The flat rectangular cutting bit is detachably mounted in a recess of the revolvable body. However, the adjusting mechanism in U.S. Pat. No. 4,425,063 precludes radial adjustment of the cutting edge position of the cutting insert.

U.S. Pat. No. 4,611,516 to Hochmuth, et al. discloses a rotary metal cutting tool having a plurality of radially adjustable cutting inserts mounted on the periphery thereof. Each cutting insert is clamped by a clamping jaw, and is urged radially outwardly by an adjusting screw positioned radially inwardly therefrom, thereby occupying considerable space near the center of the tool body, and limiting the number of cutting inserts which can be installed.

SUMMARY OF THE INVENTION

In accordance with the present invention, there is provided a metal cutting tool comprising at least one insert pocket having a cutting insert removably secured therein in communication with an adjusting mechanism; the cutting insert comprising at least one insert adjusting slot extending between two opposing major faces and opening out to each major face at an adjusting aperture. The adjusting mechanism comprises at least one adjusting member having an adjusting member top face. In a major face view of the at least one cutting insert, the adjusting aperture of each insert major face at least partially overlaps the adjusting member top face.

Preferably, the cutting insert overlies the adjusting member top face.

Further preferably, the cutting insert comprises two opposing end faces, each end face extending between two major edges formed at the intersection thereof with the two opposing major faces, each end face comprises an abutment surface extending between the major edges.

Yet further preferably, a tangentially-leading radially-outermost major edge of the cutting insert is continuously positionable between a first radial position and a second radial position; in the first radial position the tangentially-leading radially-outermost major edge is positioned at a first radial distance $O_1$ from the axis of rotation of the cutting tool; in the second radial position the tangentially-leading radially-outermost major edge is positioned at a second radial distance $O_2$ from the axis of rotation of the cutting tool, and the second radial distance $O_2$ is greater than the first radial distance $O_1$.

If desired, the tangentially-leading radially-outermost major edge is positioned by inserting a key into an adjusting socket formed in the adjusting member top face, and turning the at least one adjusting member of the adjusting mechanism.

Preferably, the adjusting mechanism comprises an adjusting plate having a plate top face, a plate bottom face, and a plate peripheral face extending therebetween transversely to the plate bottom face having at least one plate adjusting slot extending between and opening out to the plate bottom face and the plate top face, the plate top and bottom faces forming an acute wedge plate angle $\phi$ therebetween.

Further preferably, the wedge plate angle $\phi$ is less than 45°.

Yet further preferably, the wedge plate angle $\phi$ is 15°.

If desired, the adjusting plate comprises a plate clamping slot extending between the plate top face and the plate bottom face.

If further desired, a radially-innermost major face of the cutting insert abuts the plate top face.

If yet further desired, the plate bottom face abuts a recess base of a recess formed in a pocket base of the insert pocket.

Typically, the adjusting plate is adjustably positioned parallel to the recess base by adjustably positioning the at least one adjusting member Alternatively, the adjusting mechanism comprises at least one adjusting wedge having a wedge bottom and a wedge peripheral surface extending perpendicularly thereto. The wedge peripheral surface comprises a leading surface portion extending from the wedge bottom to a wedge intermediate surface and a back surface portion extending between the wedge bottom and a wedge top. The wedge intermediate surface and the wedge bottom form an acute internal wedge intermediate angle $\omega$ therebetween.

Preferably, the wedge intermediate angle $\omega$ is less than 45°.

If desired, the wedge intermediate angle is 20°

If further desired, a wedge support wall extends from the wedge top towards the wedge intermediate surface perpendicularly thereto.

Generally, a threaded wedge adjusting through-hole extends along a wedge-hole axis H perpendicularly from wedge bottom to the wedge intermediate surface and engages therein a threaded member top portion of the adjusting member.

Preferably, the at least one adjusting wedge is located in a wedge recess extending inwardly from a pocket base of the insert pocket. The wedge base comprises a threaded wedge recess adjusting bore having an adjusting bore axis B extending inwardly from the wedge recess base perpendicularly thereto.

Further preferably, a member bottom portion of the adjusting member is threaded into the wedge recess adjusting bore and the at least one adjusting wedge is adjustably positioned relative to a wedge recess base of the wedge recess by rotating the at least one adjusting member.

Further in accordance with the present invention, there is provided a cutting insert comprising two opposing insert end faces and an insert peripheral face extending therebetween, the insert peripheral face comprising two opposing insert major faces extending transversely between the insert end faces, the cutting insert having an insert clamping hole extending between the two opposing insert major faces and disposed between two insert adjusting slots extending between the two insert major faces.

Preferably, each insert adjusting slot forms an adjusting aperture at a junction thereof with each insert major face, each adjusting aperture having a length dimension taken perpendicularly to the insert end faces and a width dimension taken perpendicularly to the length dimension, the length dimension being greater than the width dimension.

Yet further in accordance with the present invention, there is provided a method of adjusting a position of a cutting insert removably secured in a metal cutting tool. The method comprising the steps of:

providing an adjusting mechanism comprising at least one adjusting member having an adjusting member top face with an adjusting socket designed to receive a key formed therein;

providing the cutting insert with at least one insert adjusting slot extending between and opening out to two opposing insert major faces at an adjusting aperture;

securing the cutting insert in the cutting tool so that the at least one adjusting member top face and the adjusting aperture of each insert major face at least partially overlap in a major face view of the cutting insert;

inserting the key through the insert adjusting slot to the adjusting socket; and rotating the key; whereby the position of the cutting insert relative to the cutting tool is adjusted.

BRIEF DESCRIPTION OF THE DRAWINGS

For a better understanding of the present invention and to show how the same may be carried out in practice, reference will now be made to the accompanying drawings, in which:

FIG. 7 is a bottom view of the adjusting plate shown in FIG. 5;

FIG. 8 is a cross sectional view of the adjusting plate, taken along the line VIII-VIII in FIG. 7;

FIG. 9 is a cross sectional view of the adjusting plate, taken along the line IX-IX in FIG. 7

DETAILED DESCRIPTION OF THE INVENTION

Figure 1:
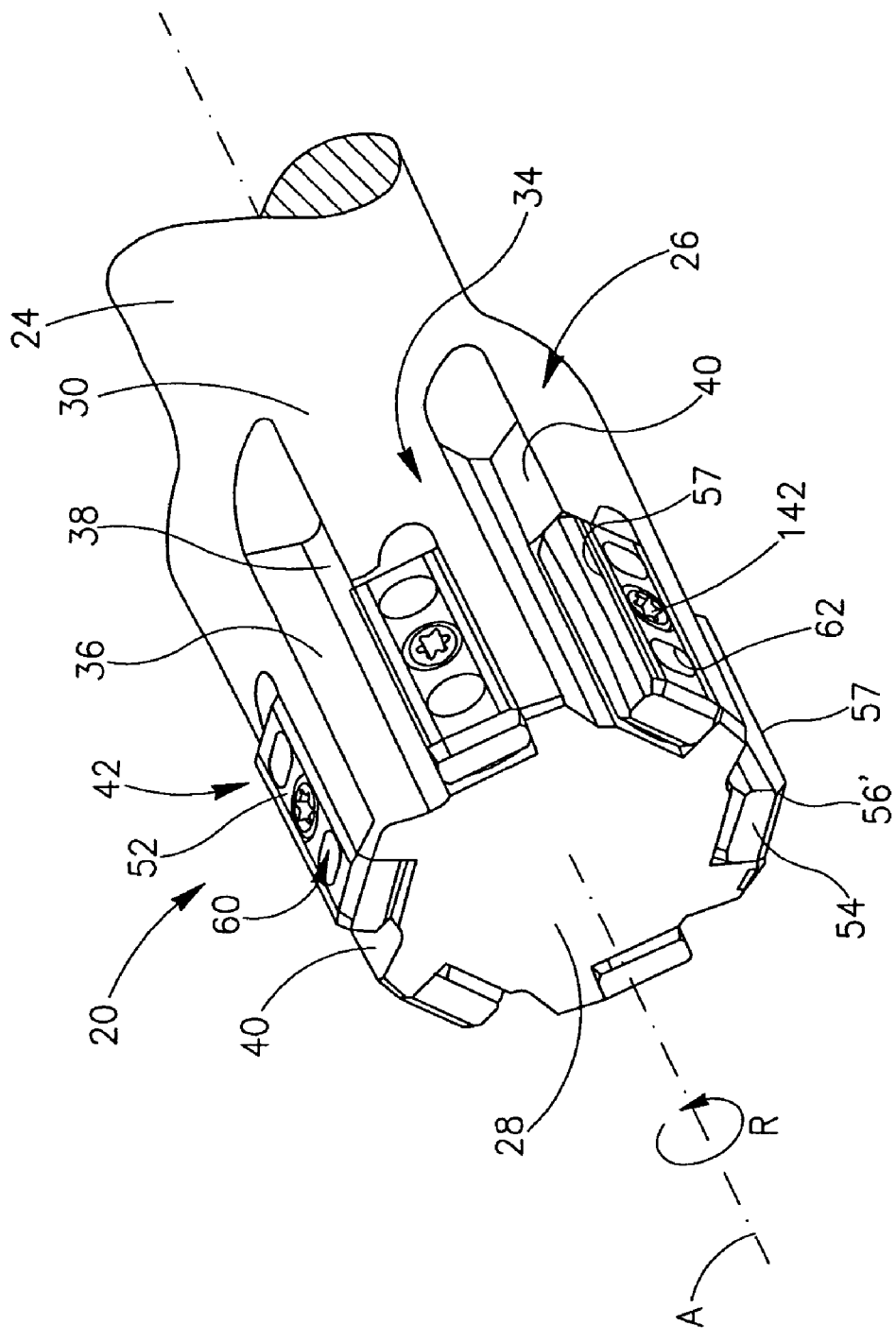
FIG. 1 is a perspective view of a reamer of a first embodiment of the present invention.

Attention is first drawn to FIG. 1. A reamer 20 of a first embodiment of the present invention comprises a tool body 22 of a generally cylindrical shape having an axis of rotation A defining a front-to-rear direction and a direction of rotation R. The tool body 22 comprises a rear tool shank 24 and a front tool cutting portion 26. The tool cutting portion 26 comprises a tool front face 28 and a cutting-portion peripheral surface 30 extending axially rearwardly therefrom. It should be noted that directional terms appearing throughout the specification and claims, e.g. "front", "rear", "leading", "trailing", etc., (and derivatives thereof) are for illustrative purposes only, and are not intended to limit the scope of the appended claims.

Figure 2:
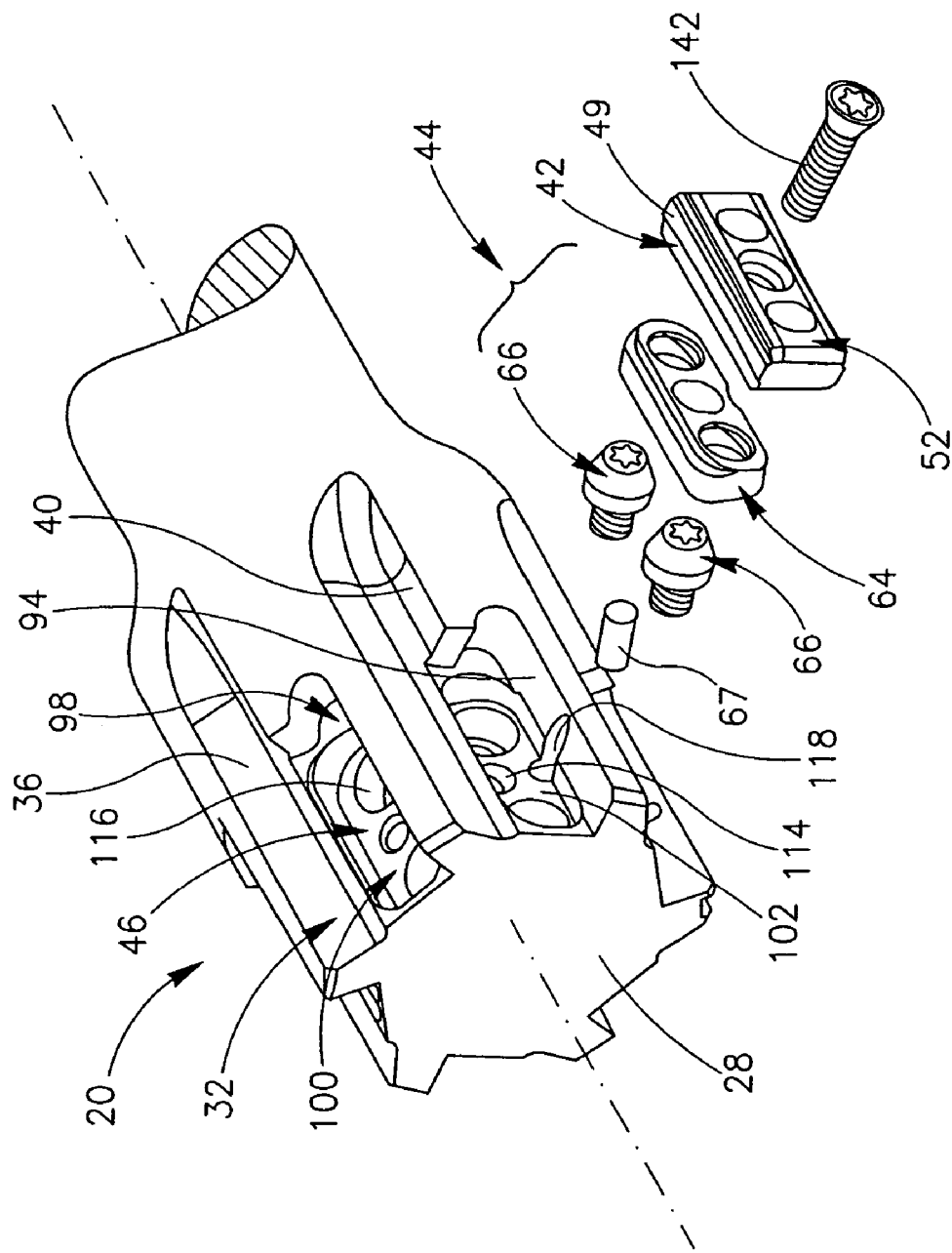
FIG. 2 is an exploded perspective view of the reamer shown in FIG. 1.

The cutting-portion peripheral surface 30 comprises a plurality of flutes 32 extending axially rearwardly from the tool front face 28 and inwardly from the cutting-portion peripheral surface 30. The flutes 32 define therebetween mounting portions 34. Each flute 32 has a generally asymmetrical V-shape and comprises a flute leading face 36, a flute bottom face 38 and a flute trailing face 40. Each mounting portion 34 extends from the flute trailing face 40 of a preceding flute 32 to the flute leading face 36 of a following flute 32, and comprises a cutting insert 42 detachably secured therein. As shown in FIG. 2, each cutting insert 42 is in communication with an adjusting mechanism 44. The cutting insert 42 and the adjusting mechanism 44 are mounted in an insert pocket 46 located in the mounting portion 34, so that when secured in the reamer 20, the cutting insert 42 overlies the adjusting mechanism 44 in the radial direction.

Figure 3:
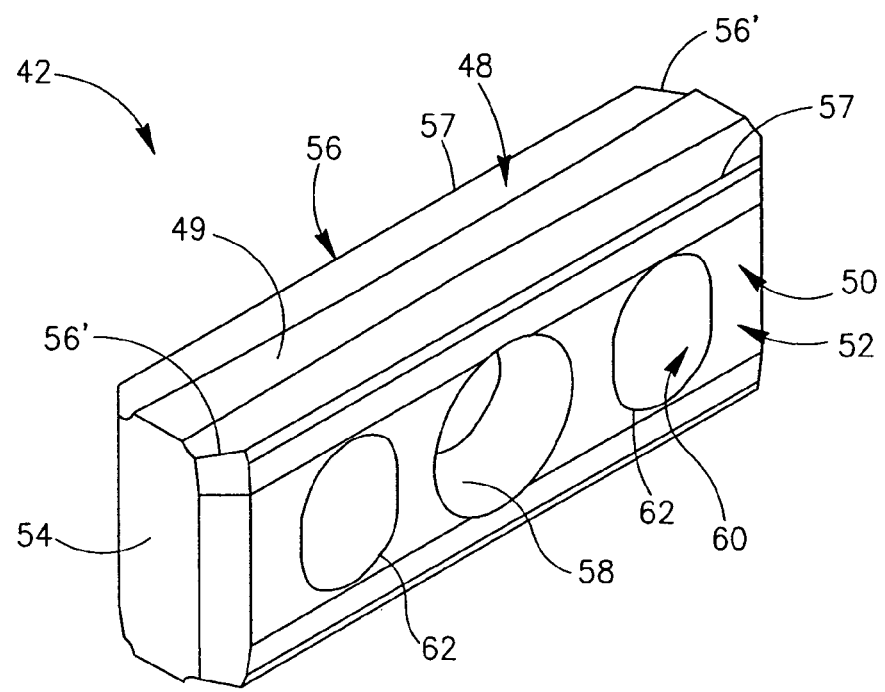
FIG. 3 is a perspective view of a cutting insert of the reamer shown in FIGS. 1 and 2.
Figure 4:
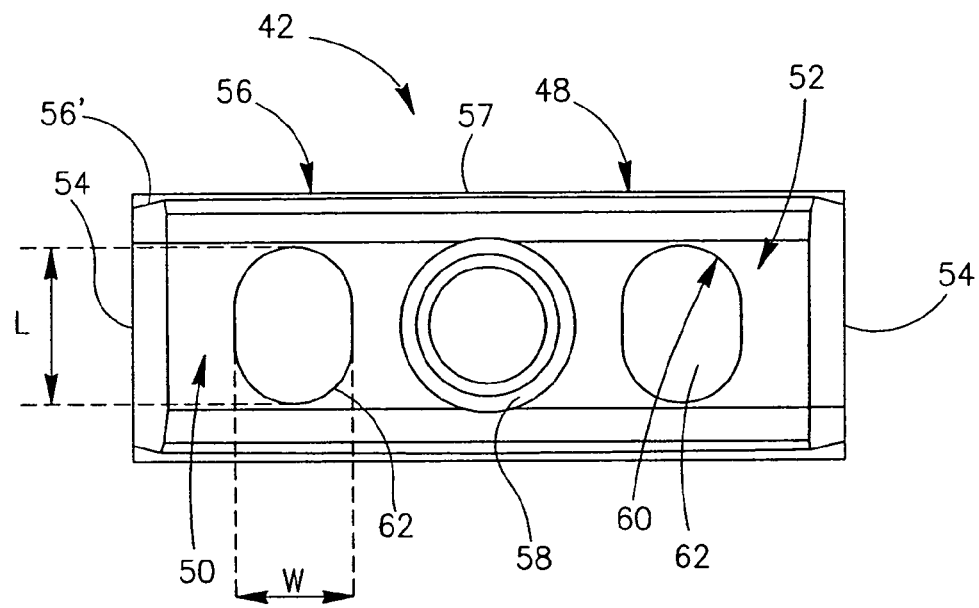
FIG. 4 is a top view of a major face of the cutting insert shown in FIG. 3.
Figure 5:
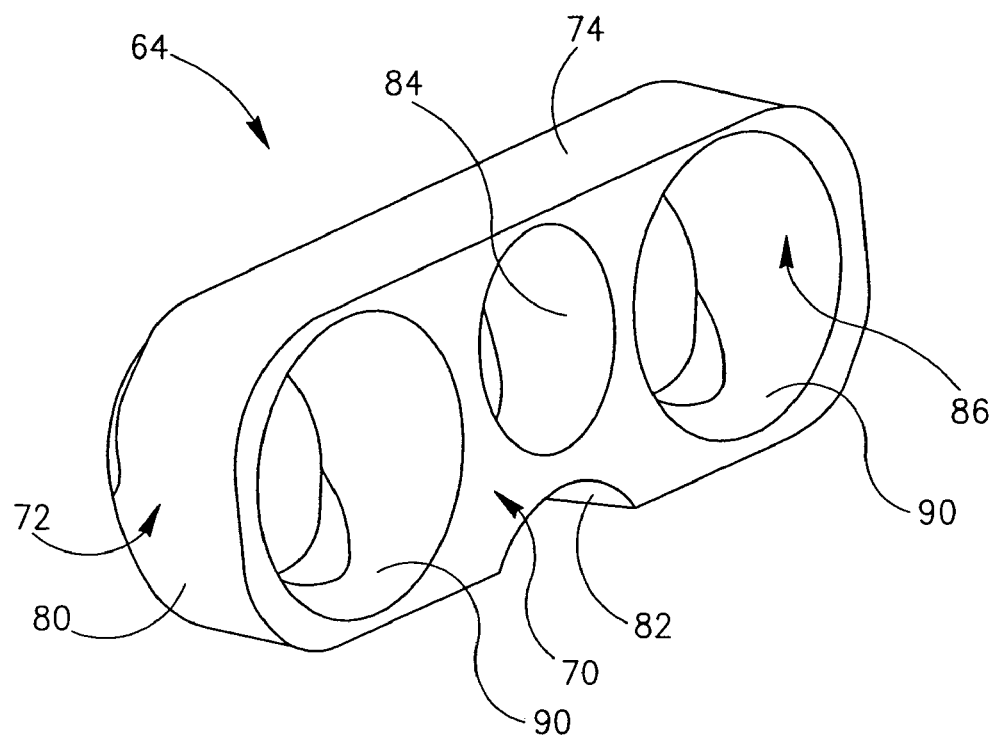
FIG. 5 is a bottom perspective view of an adjusting plate of the reamer shown FIG. 2.
Figure 6:
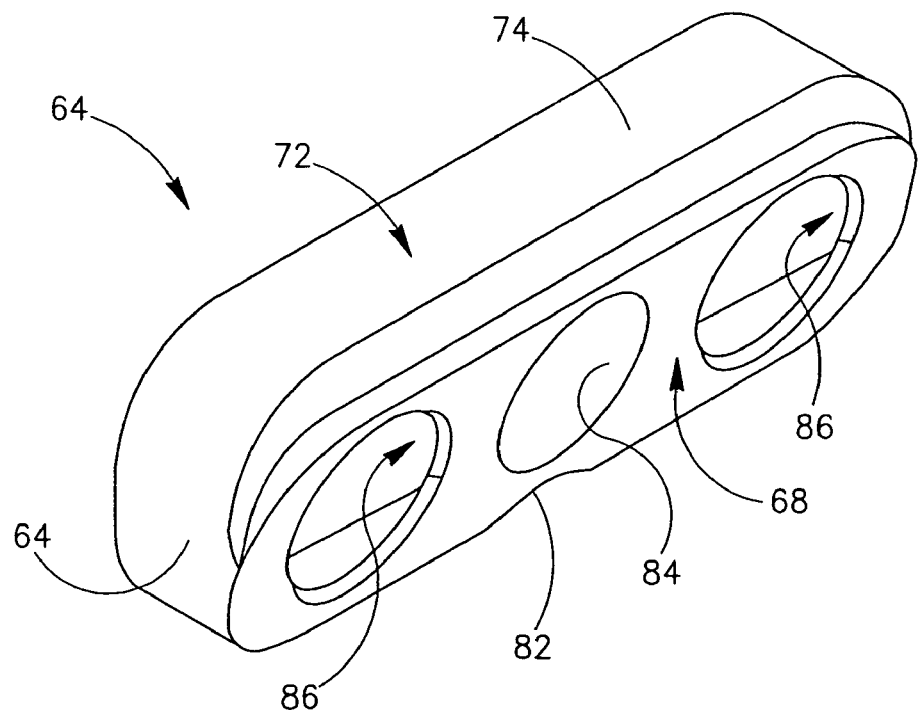
FIG. 6 is a top perspective view of the adjusting plate shown in FIG. 5.

Attention is now drawn to FIGS. 3 and 4. The cutting insert 42 is of a generally prismoidal shape and comprises two opposing insert end faces 48 and an insert peripheral face 50 which extends therebetween. The insert peripheral face 50 comprises two opposing insert major faces 52 and two opposing insert minor faces 54 disposed transversely to the insert end faces 48 and the insert major faces 52. The junction of the insert peripheral face 50 and each insert end face 48 defines an insert peripheral edge 56 having two parallel insert major edges 57 each defined at an intersection of the insert end face and an adjacent insert major face 52. Each insert end face 48 is formed with a planar insert abutment surface 49 located between the two insert major edges 57 of the insert end face 48 and extending between the two opposing insert minor faces 54 perpendicularly to the insert major and minor faces 52, 54. At least a portion of the insert peripheral edge 56 may be adapted for use as a cutting edge 56'. The cutting geometry of the cutting insert 42 and the cutting edges may be of any appropriate design.

The cutting insert 42 further comprises an insert clamping hole 58 extending between the two opposing insert major faces 52, and two insert adjusting slots 60 extending between the two insert major faces 52 and forming an adjusting aperture 62 at the junction of each insert major face 52 and each insert adjusting slot 60. As is best shown in FIG. 4, each adjusting aperture has a length dimension L taken perpendicularly to the insert end faces 48, and a width dimension W taken perpendicularly to the length dimension L. The length dimension L of each adjusting aperture 62 is greater than the width dimension W thereof, because the cutting insert 42 is of an indexable and reversible design, and because the adjusting slots 60 and the adjusting apertures 62 thereof must facilitate access to the underlying adjusting mechanism 44 in order to adjust the position of the cutting insert 42, as will be further explained below.

As shown in FIG. 2, the adjusting mechanism 44 comprises a generally wedge-shaped adjusting plate 64, two adjusting members 66, and a biasing element 67. As best shown in FIGS. 5 to 9, the adjusting plate 64 comprises a plate top face 68, a plate bottom face 70 and a plate peripheral face 72 extending therebetween. The plate top and bottom faces are disposed at an acute internal plate wedge angle φ relative to each other. Generally, the plate wedge angle φ is less than 45°. In accordance with a particular embodiment, the plate wedge angle φ is 15°. However, the plate wedge angle φ may vary. The plate peripheral face 72 comprises a plate leading face 74, a plate trailing face 76 generally parallel thereto, and plate curved front and rear faces 78, 80 extending therebetween. The plate trailing face 76 comprises a plate cylindrical depression 82 centrally disposed therein and extending between the plate top face 68 and the plate bottom face 70. The plate top face 68 extends from the plate leading face 74 to the plate trailing face 76, sloping towards the plate bottom face 70.

The adjusting plate 64 further comprises a plate clamping slot 84 extending between the plate top face 68 and the plate bottom face 70. Two plate adjusting slots 86 are located on either side of the plate clamping slot 84 and extend between the plate top face 68 and the plate bottom face 70. The plate adjusting slots 86 are of a generally frustoconical shape converging and extending away from the plate bottom face 70 to the plate top face 68. Each plate adjusting slot 86 comprises an adjusting slot abutting portion 90 adjacent the plate trailing face 76.

Figure 10:
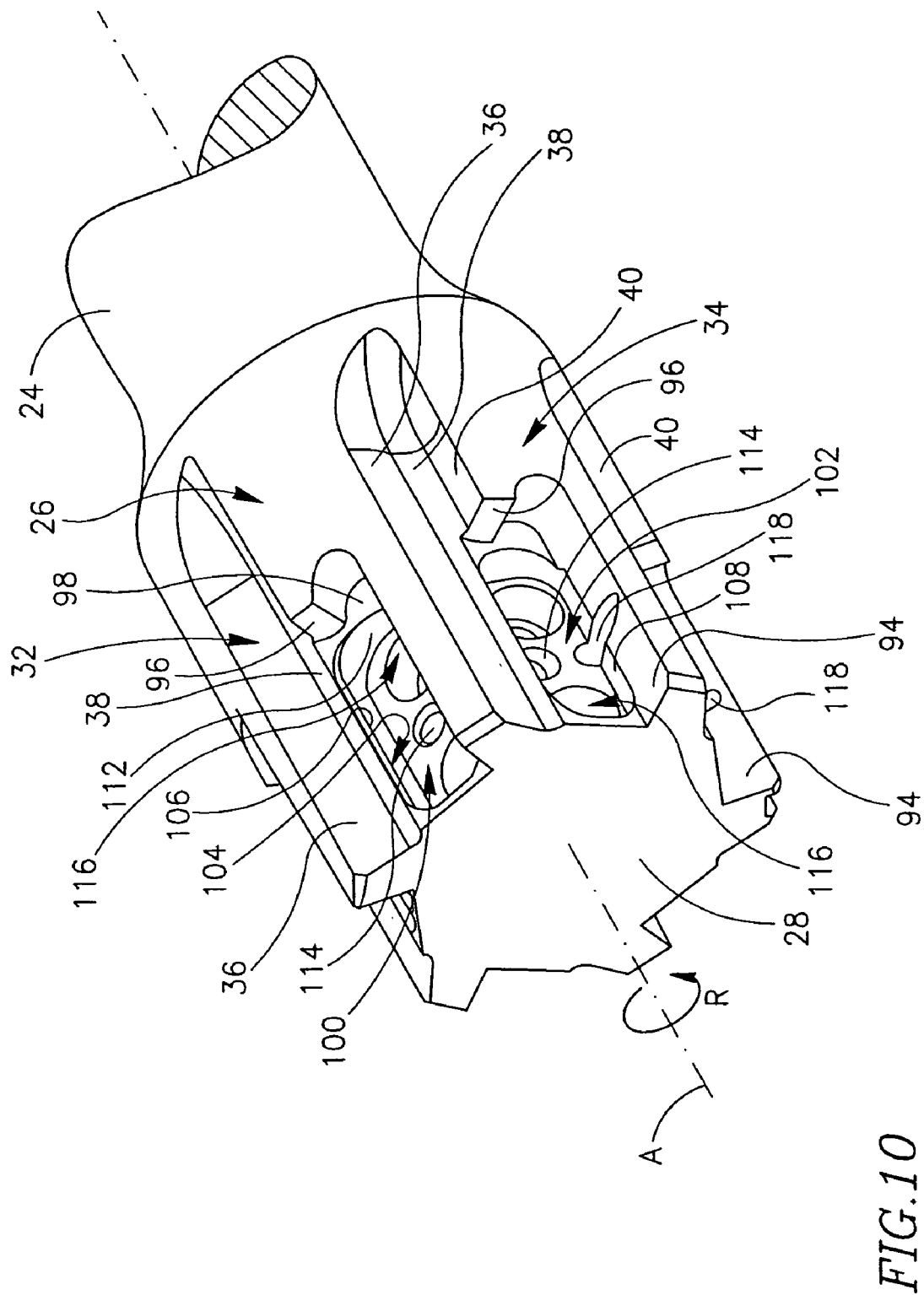
FIG. 10 is a view of the reamer shown in FIG. 1, with the cutting inserts and the adjusting mechanisms removed.
Figure 11:
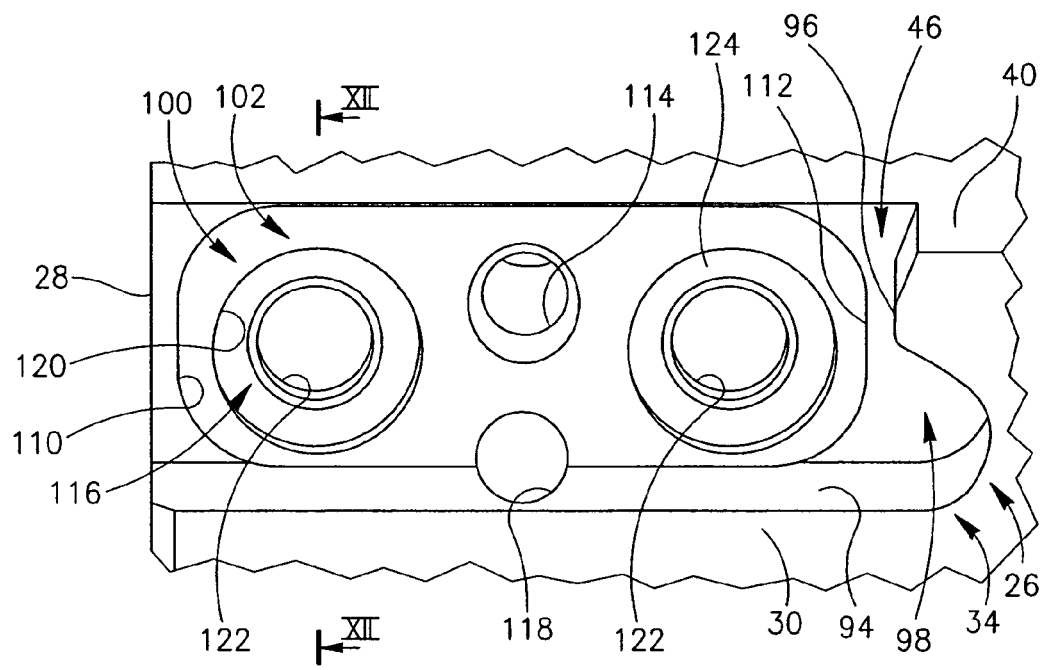
FIG. 11 is a top view of an insert pocket shown in FIG. 10.
Figure 12:
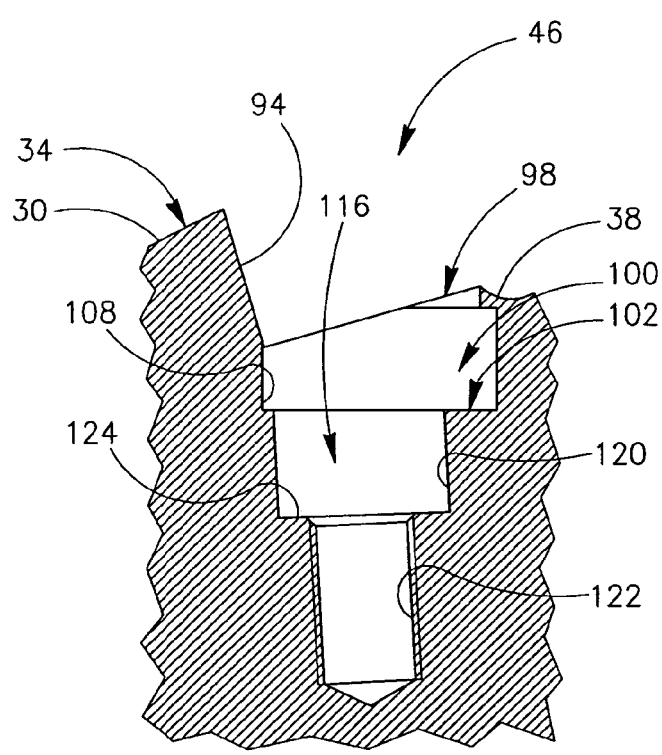
FIG. 12 is a cross-sectional view of the insert pocket taken along lines XII-XII in FIG. 11.

Attention is now drawn to FIGS. 10 to 12. The insert pocket 46 comprises a tangential support wall 94 extending rearwardly from the tool front face 28, an axial support wall 96 extending away therefrom to the flute trailing face 40 of the preceding flute 32, and a radially outwardly facing pocket base 98. A plate recess 100 extends radially inwardly from the pocket base 98, the plate recess 100 comprising a plate recess base 102 and a plate recess peripheral wall 104 extending transversely thereto. The plate recess peripheral wall 104 comprises a plate recess leading wall 106, a plate recess trailing wall 108 generally parallel thereto and front and rear recess curved walls 110, 112 extending therebetween.

The plate recess base 102 extends from the plate recess leading wall 106 to the plate recess trailing wall 108, sloping radially outwardly so that it is closer to the axis of rotation A at the plate recess leading wall 106 than at the plate recess trailing wall 108.

The plate recess base 102 comprises a threaded clamping bore 114 extending substantially radially inwardly from the plate recess base 102. Two parallel adjusting bores 116 are disposed symmetrically forwardly and rearwardly relative to the threaded clamping bore 114, and inwardly from and perpendicularly to the plate recess base 102. A biasing bore 118 extends inwardly from the plate recess base 102 parallel to the adjusting bores 116. As is best shown in FIG. 12, each adjusting bore 116 comprises an adjusting bore cylindrical portion 120 extending inwardly from the plate recess base 102, an adjusting bore threaded portion 122 extending inwardly away therefrom, and an outwardly facing adjusting bore shoulder 124 connected therebetween.

Figure 15:
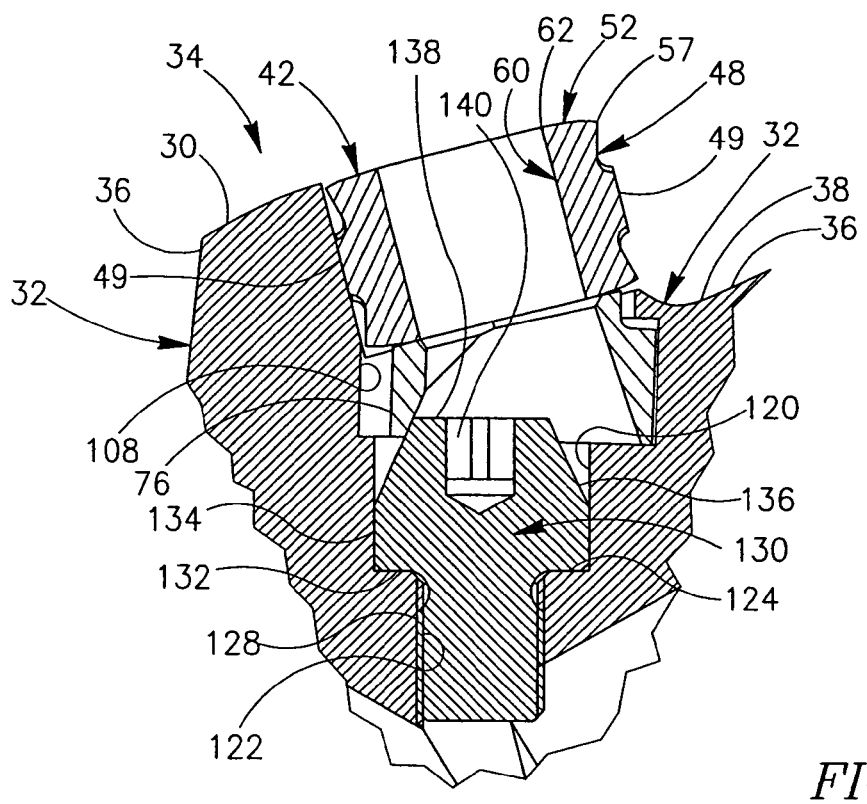
FIG. 15 is a cross-sectional view taken along the line XV-XV in FIG. 13, showing the cutting insert, the adjusting plate, the insert pocket and an adjusting member in a first position.
Figure 16:
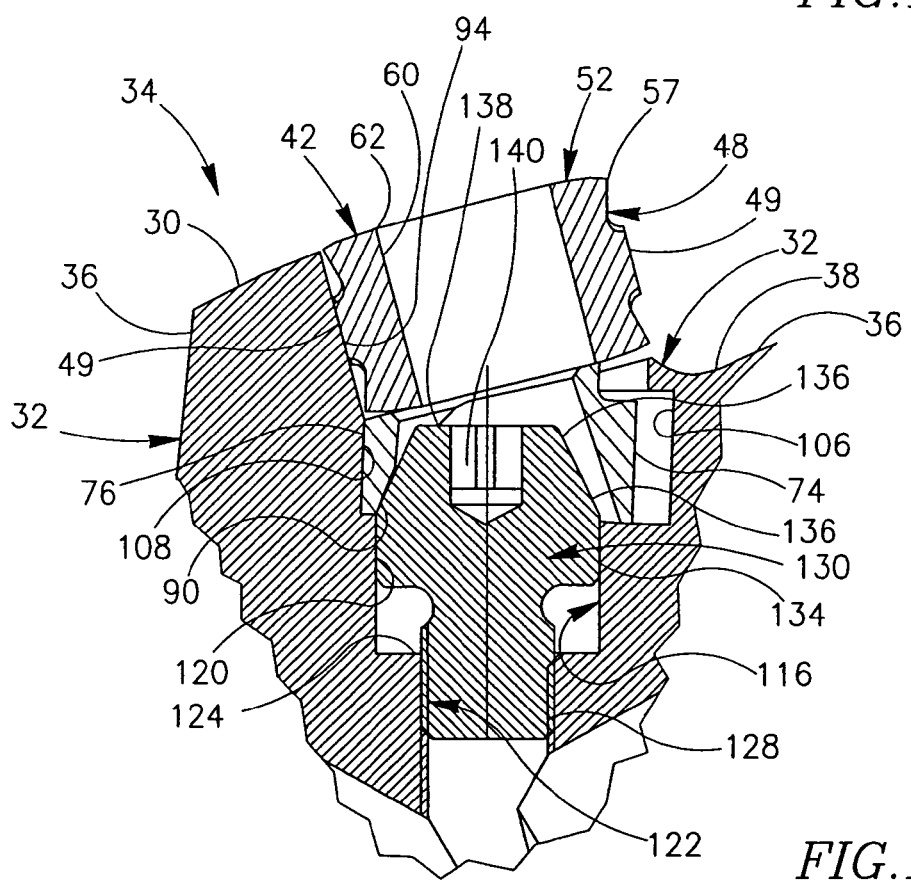
FIG. 16 is the cross sectional view taken along the line XV-XV in FIG. 13, showing the cutting insert, the adjusting plate, the insert pocket and the adjusting member in a second position.

With reference to FIGS. 15 and 16, each adjusting member 66 comprises an adjusting member head 130 at a forward end thereof, and a threaded adjusting stem 128 extending coaxially away therefrom. The adjusting member head 130 comprises a rearwardly facing adjusting head shoulder 132, an adjusting member cylindrical portion 134 extending forwardly away therefrom, and a head frustoconical portion 136 extending coaxially with and converging inwardly away from the adjusting member cylindrical portion 134, terminating in an adjusting member top face 138. The adjusting member head 130 has an adjusting socket 140 centrally disposed in the adjusting member top face 138, the adjusting socket 140 being designed to receive a key (not shown). The key, and the corresponding adjusting socket 140, may be of any appropriate design.

Figure 13:
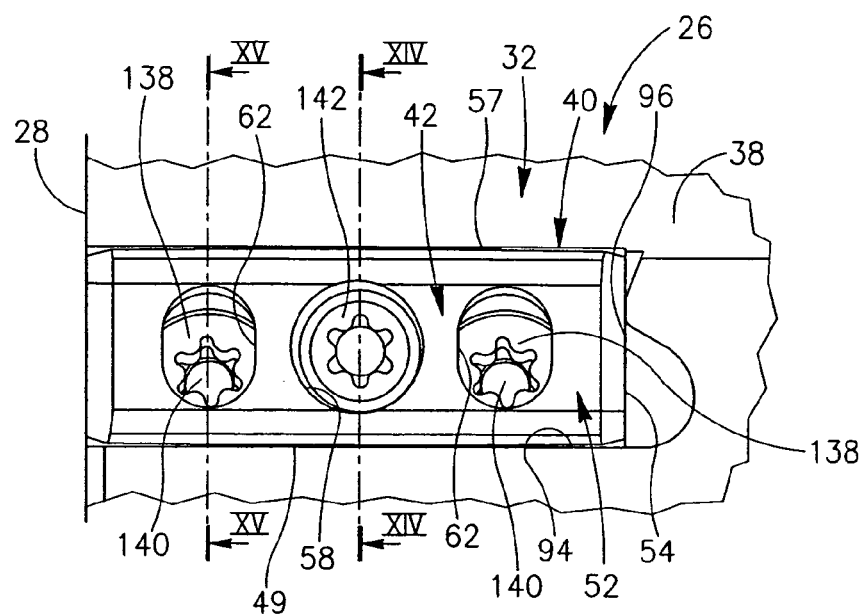
FIG. 13 is a detail view of the reamer shown in FIG. 1, showing a top view of the major face of the cutting insert.
Figure 14:
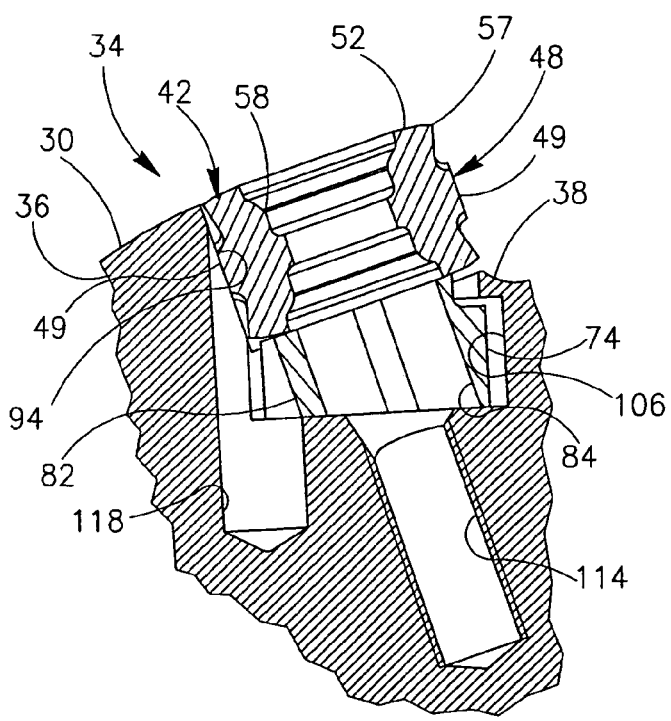
FIG. 14 is a cross-sectional view taken along the line XIV-XIV in FIG. 13, showing the cutting insert and the adjusting plate (with the clamping screw and the biasing element removed for clarity)

Attention is now drawn to FIGS. 13 to 14. The cutting insert 42 is secured in the reamer 20 of the first embodiment in an insert first radial position, by inserting the biasing element 67 into the biasing bore 118, threading the threaded adjusting stem 128 of each adjusting member 66 into the respective adjusting bore threaded portion 122 until the adjusting member shoulder 132 abuts the adjusting bore shoulder 124, and placing the adjusting plate 64 in the plate recess 100 with the plate bottom face 70 abutting the plate recess base 102. In the insert first radial position, the plate cylindrical depression 82 abuts the biasing element 67, which urges the adjusting plate 64 away from the plate recess trailing wall 108 to a plate first tangential position, in which each adjusting slot abutting portion 90 abuts the corresponding head frustoconical portion 136.

The cutting insert 42 is located on the adjusting plate 64 with a radially innermost insert major face 52 abutting the plate top face 68, and with the insert abutment surface 49 of a tangentially trailing insert end face 48 abutting the tangential support wall 94 and an axially rearwardly-disposed insert minor face 54 abutting the axial support wall 96. The cutting insert 42 is secured in the insert first radial position by inserting a clamping screw 142 through the insert clamping hole 58 and through the plate clamping slot 84, and threading the clamping screw 142 into the threaded clamping bore 114 of the insert pocket 46.

When secured in the insert pocket 46, the cutting insert 42 overlies the adjusting mechanism 44 in the radial direction, and the adjusting apertures 62 overlap the plate adjusting slots 86, so that the adjusting member top face 138 and the adjusting socket 140 are at least partly visible and accessible through the adjusting apertures 62 and the plate adjusting slots 86. In the insert first radial position, a tangentially-leading, radially-outermost insert major edge 57 is located at a first radial distance $O_1$ from the axis of rotation A of the reamer 20 of the first embodiment.

The cutting insert 42 can be continuously positioned between the insert first radial position and an insert second radial position, in which the tangentially-leading, radially-outermost insert major edge 57 is located at a second radial distance $O_2$ from the axis of rotation A of the reamer 20 of the first embodiment, the second radial distance $O_2$ being greater than the first radial distance $O_1$.

Figure 17:
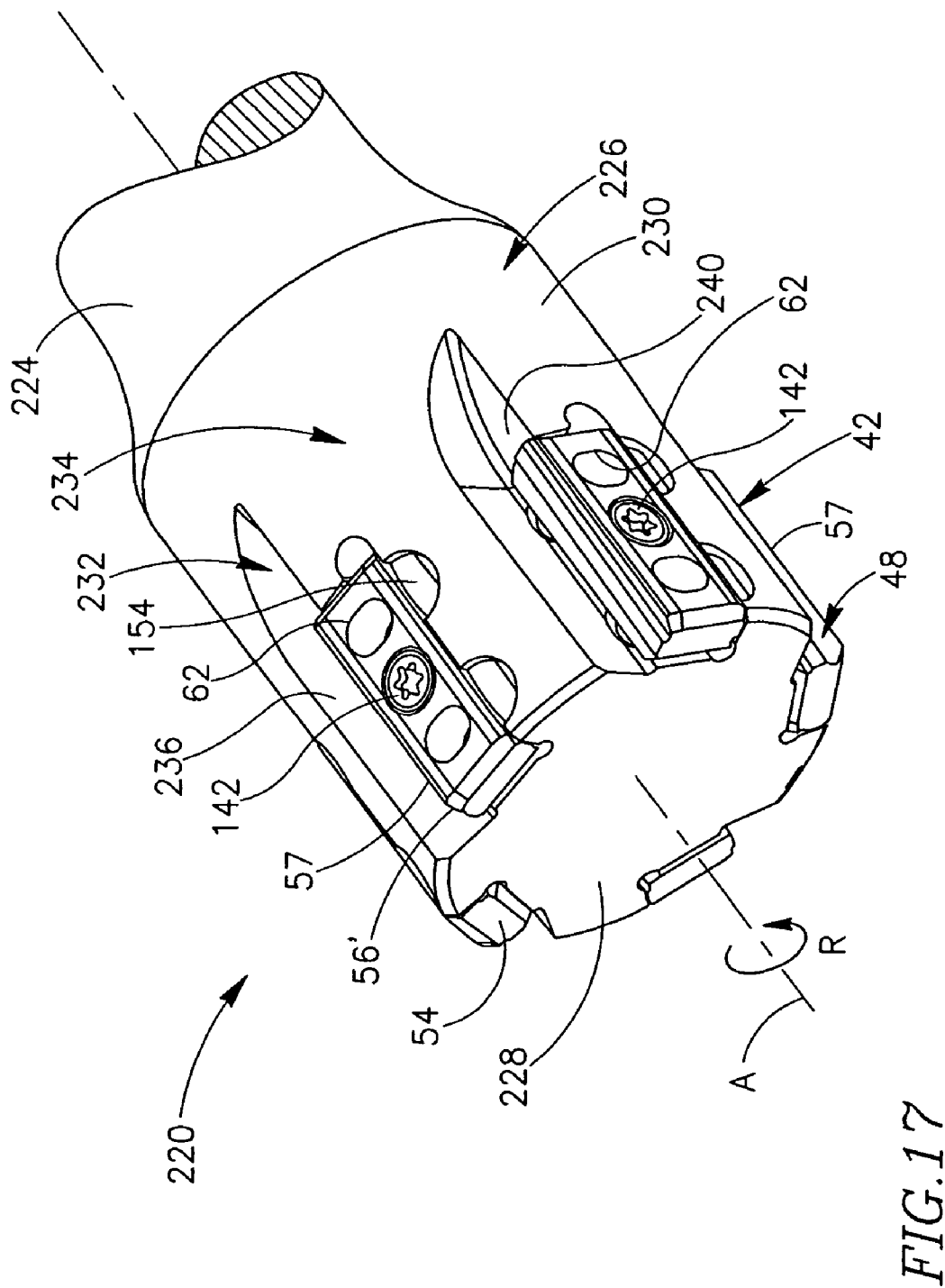
FIG. 17 is a perspective view of a reamer of a second embodiment of the present invention.
Figure 18:
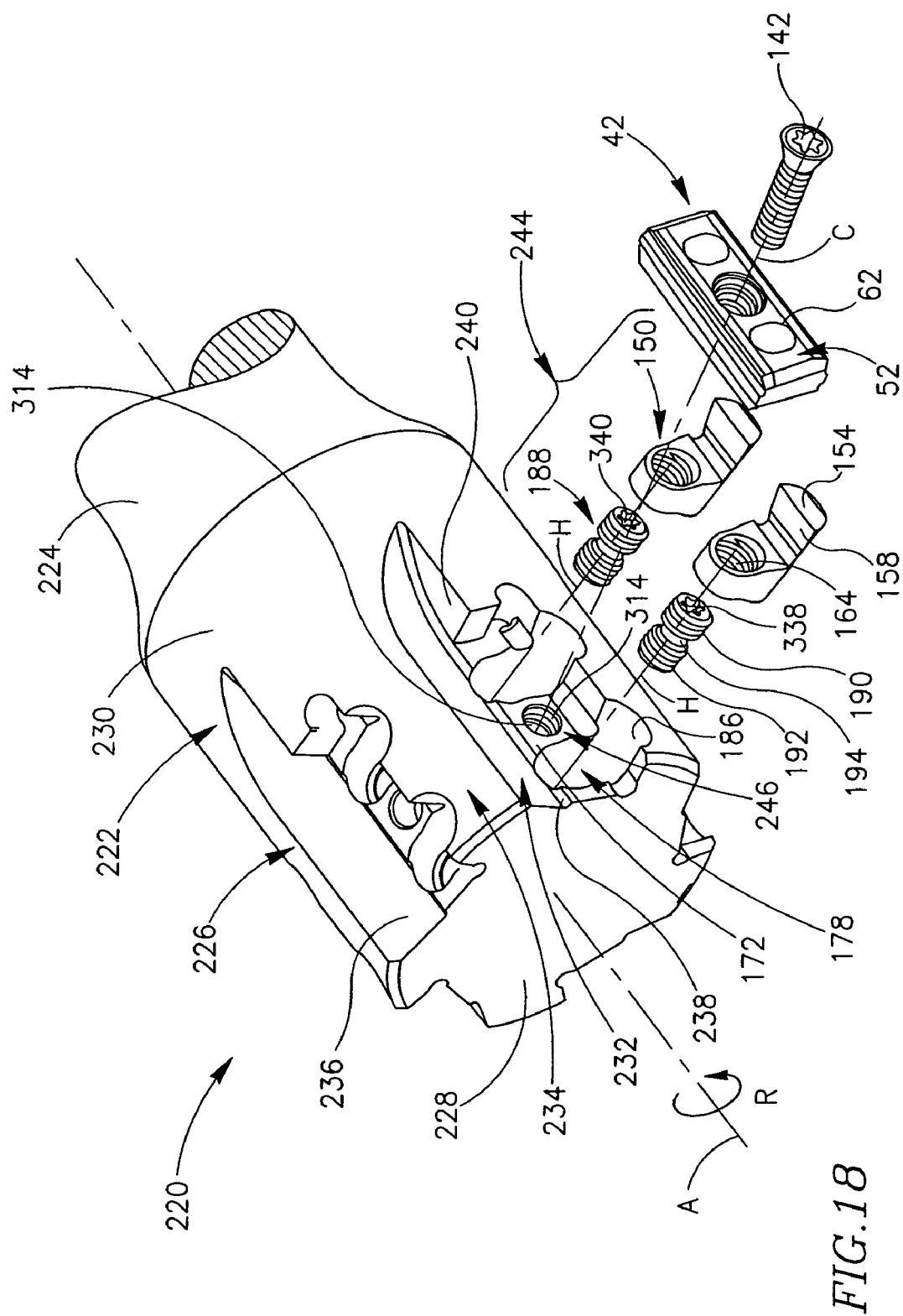
FIG. 18 is an exploded perspective view of the reamer shown in FIG. 17.

To adjust the position of the cutting insert 42 and of a tangentially-leading, radially-outermost major edge 57 thereof, the clamping screw 142 is slightly loosened, to allow the cutting insert 42 a small amount of movement, while still remaining clamped to the tool body 22. Adjustment of the position of the cutting insert 42 is facilitated by inserting the key through the insert adjusting slot 60 to the adjusting socket 140, and rotating the key, thereby causing the adjusting member 66 to retract from the adjusting bore 116. As the adjusting member 66 is retracted, the head frustoconical portion 136 urges the adjusting plate 64 to slide parallel to the plate recess base 102, towards the plate recess trailing wall 108, against the biasing element 67 biasing force. The biasing element 67 may be an elastomeric member, or the like. The plate recess base 102 slopes radially outwardly while extending from the plate recess leading wall 106 to the plate recess trailing wall 108, so that as the adjusting plate 64 is urged towards the plate recess trailing wall 108, it is also urged radially outwardly. Since the cutting insert 42 is located on the adjusting plate 64, urging the adjusting plate radially outwardly also urges radially outwardly the tangentially-leading, radially-outermost major edge 57 of the cutting insert 42. Attention is now directed to FIGS. 17 and 18 showing a reamer 220 of a second embodiment of the present invention. Since the reamer 220 of the second embodiment has many features which are similar to those of the reamer 20 of the first embodiment, the similar features of the reamer 220 of the second embodiment will be referred to herein below by reference numerals which are shifted by 200 from those of the reamer 20 of the first embodiment.

The reamer 220 of the second embodiment has an axis of rotation A defining a front-to-rear direction and a direction of rotation R defined much in the same manner as the axis of rotation A and a direction of rotation R of the reamer 20 of the first embodiment. The reamer 220 has a tool body 222 comprising a rear tool shank 224 and a front tool cutting portion 226. The tool cutting portion 226 terminates at a tool front face 228 from which a cutting-portion peripheral surface 230 extends axially rearwardly.

The cutting-portion peripheral surface 230 comprises a plurality of generally V-shaped flutes 232 extending axially rearwardly from the tool front face 228 and inwardly from the cutting-portion peripheral surface 230. Every two successive flutes 232 define therebetween a mounting portion 234. Each mounting portion 234 extends from a flute trailing face 240 of a preceding flute to a flute leading face 236 of a following flute. The reamer 220 of the second embodiment utilizes the same cutting inserts 42 as the reamer 20 of the first embodiment. Each cutting insert 42 is detachably secured in the mounting portion 234, in communication with an adjusting mechanism 244. The cutting insert 42 and the adjusting mechanism 244 are placed in an insert pocket 246 formed in the mounting portion 234, so that when secured in the reamer 220, the cutting insert 42 partially overlies the adjusting mechanism 244 in the radial direction.

Figure 19:
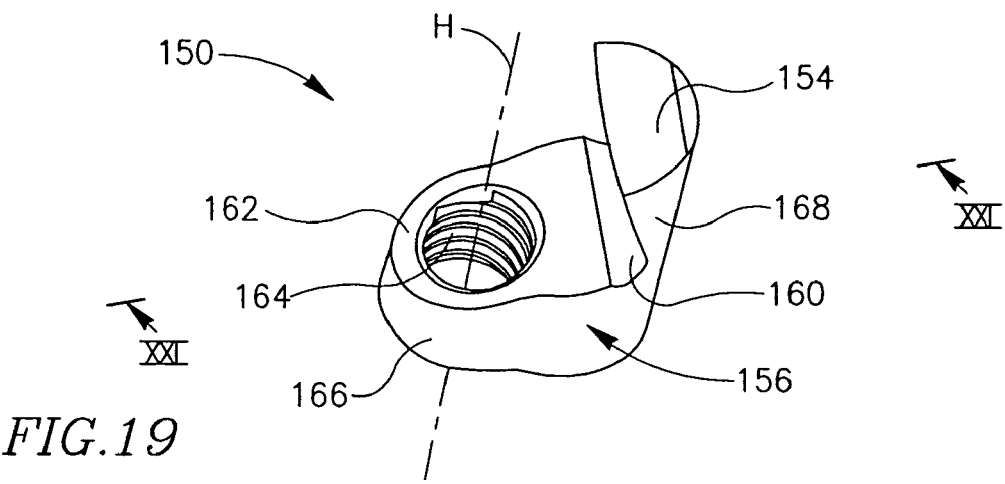
FIG. 19 is a bottom perspective view of an adjusting plate of the reamer shown FIG. 18.
Figure 20:
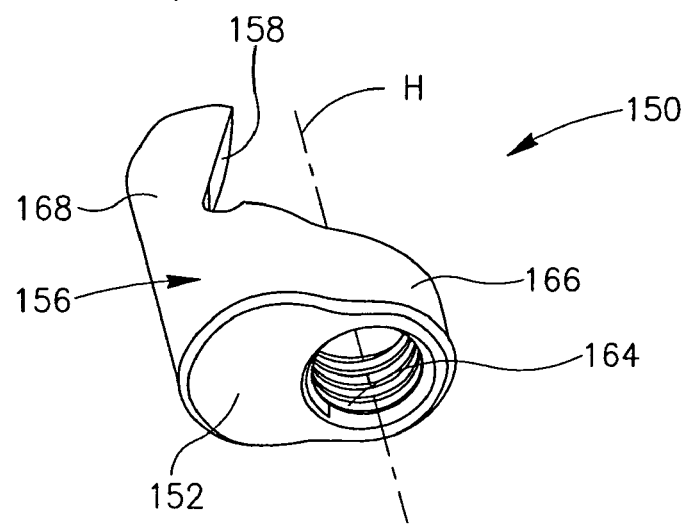
FIG. 20 is a top perspective view of the adjusting plate shown in FIG. 19.
Figure 21:
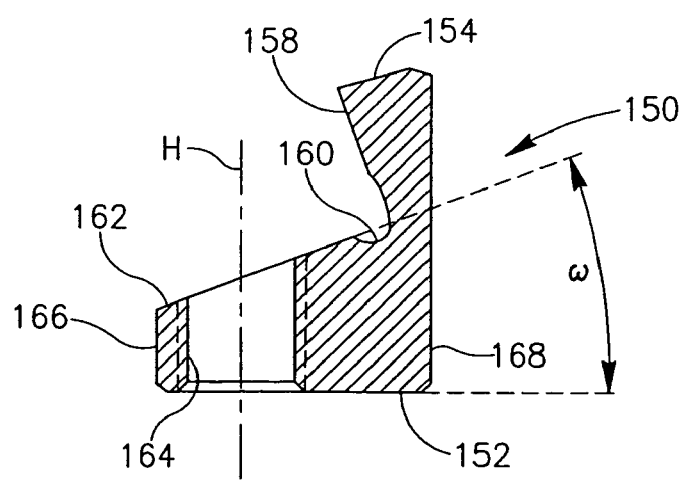
FIG. 21 is a cross sectional view of the adjusting plate, taken along the plane XXI-XXI in FIG. 20.

The adjusting mechanism 244 comprises two identical adjusting wedges 150, each associated with an adjusting member 266. As best shown in FIGS. 19 to 21, the adjusting wedge 150 has a wedge bottom 152, a wedge peripheral surface 156 extending perpendicularly from the wedge bottom 152 and a wedge top 154. A wedge support wall 158 extends from the wedge top 154 to a wedge relief channel 160 interconnecting the wedge support wall 158 and a wedge intermediate surface 162 disposed perpendicularly to the wedge support wall 158. The wedge intermediate surface 162 and the wedge bottom 152 are disposed at an acute internal wedge intermediate angle ω relative to each other. Generally, the wedge intermediate angle ω is less than 45°. In accordance with a particular embodiment, the wedge intermediate angle ω is 20°. However, the wedge intermediate angle ω may vary. A threaded wedge adjusting through-hole 164 extends from and opens out to the wedge bottom 152 and to the wedge intermediate surface 160, and has a wedge-hole axis H extending perpendicularly to the wedge bottom 152. The wedge adjusting through-hole 164 is formed with an internal left-handed thread. The wedge peripheral surface 156 has a convex leading surface portion 166 extending between the wedge bottom 152 and the wedge intermediate surface 160 and a convex trailing surface portion 168 extending between the wedge bottom 152 and the wedge top 154 and lying on a first cylindrical envelope extending parallel to the wedge-hole axis H.

Figure 22:
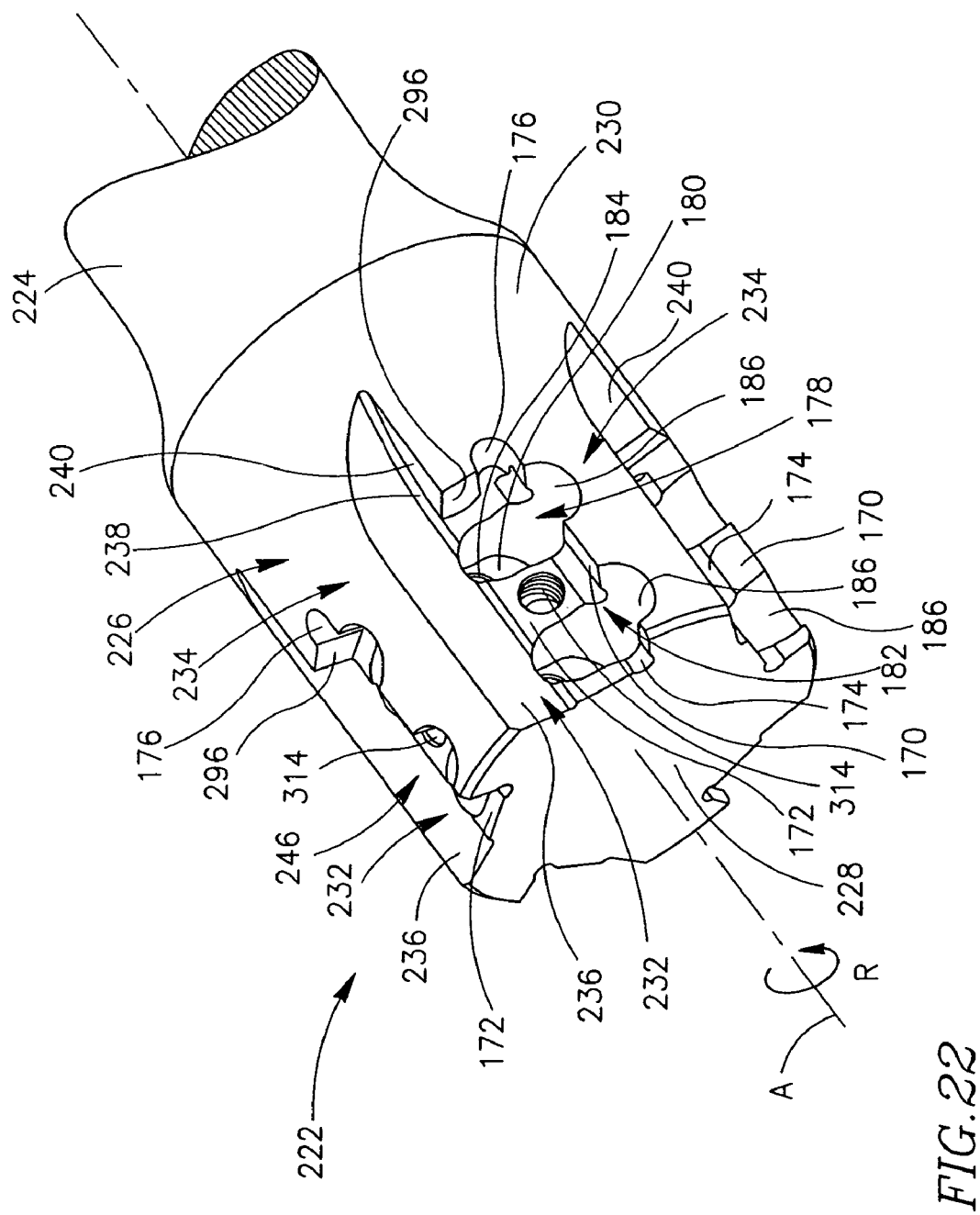
FIG. 22 is a perspective view of the reamer shown in FIG. 17, with the cutting inserts and the adjusting mechanisms removed.
Figure 23:
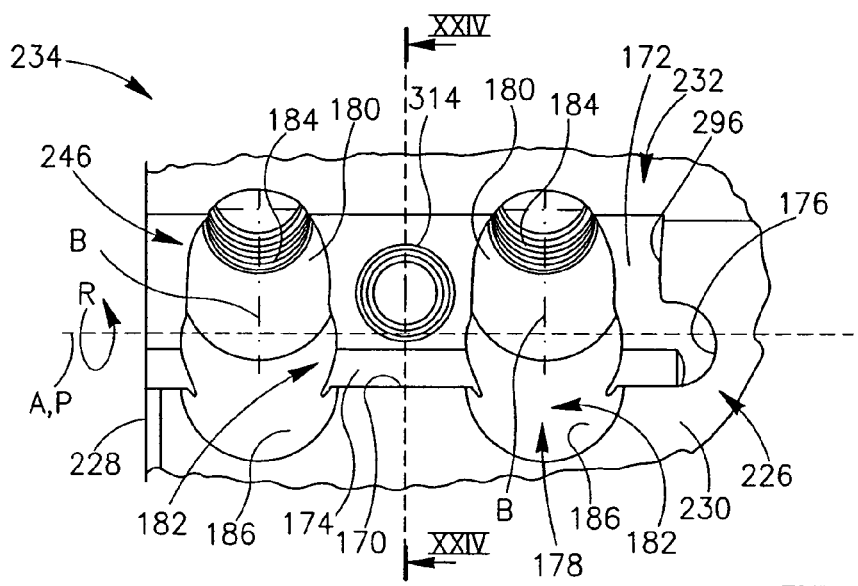
FIG. 23 is a top view of an insert pocket shown in FIG. 22, taken along an adjusting screw axis.
Figure 24:
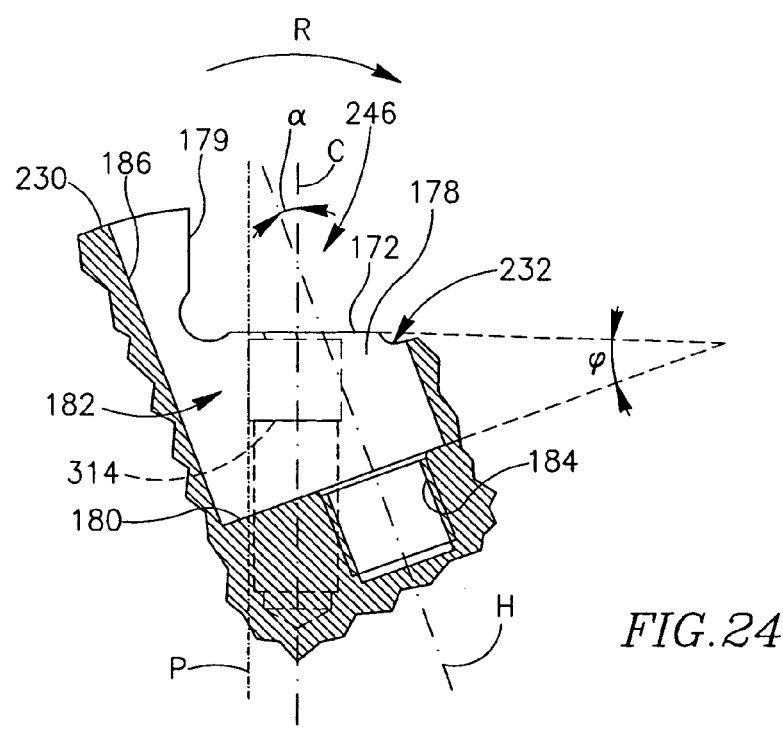
FIG. 24 is a cross-sectional view of the insert pocket taken along lines XXIV-XXIV in FIG. 23.

Attention is now drawn to FIGS. 22 to 24. The insert pocket 246 opens tangentially forwardly to the flute trailing face 240 of the preceding flute 232 and radially outwardly to the cutting-portion peripheral surface 230, and has a pocket tangential wall 170 extending rearwardly from the tool front face 228 and inwardly from the cutting-portion peripheral surface 230. A planar pocket base 172 faces radially outwardly and extends from a pocket axial slot 174 interconnecting the pocket base 172 and the tangential wall 170 to the flute trailing face 240 of the preceding flute 232 parallel to the axis of rotation A. A pocket radial slot 176 extends from the pocket base 172 to the cutting-portion peripheral surface 230, interconnecting the tangential wall 170 to an axial support wall 296 extending radially from the pocket base 172 and tangentially forwardly from the pocket radial slot 176 to the flute trailing face 240 of the preceding flute 232. The pocket base 172 extends generally perpendicularly to the tangential wall 170 and the axial support wall 296, and generally parallel to the axis of rotation A. A threaded clamping bore 314 having a clamping bore axis C is disposed on the pocket base 172 between two identical wedge recesses 178 formed therein. The clamping bore 314 extends inwardly from the pocket base 172 with the clamping bore axis C being generally perpendicularly thereto.

Each of the two wedge recesses 178 extends inwardly from the pocket base 172, and has a planar wedge recess base 180 and a wedge recess peripheral wall 182 extending from the wedge recess base 180 generally perpendicularly thereto. As is best shown in FIG. 24, a wedge recess adjusting bore 184 having an adjusting bore axis B extends inwardly from the wedge recess base 180 and perpendicularly thereto. The wedge recess adjusting bore 184 is formed with an internal right-handed thread. The adjusting bore axes B of the two wedge recesses 178 are parallel to each other and define an acute adjusting angle α with the clamping bore axis C in a cross-sectional view of the tool body 222 taken perpendicularly to the axis of rotation A. The wedge recess peripheral wall 182 has a convex trailing wall portion 186 extending from the wedge recess base 180 to the cutting-portion peripheral surface 230 and tangentially rearwardly from the tangential wall 170, the trailing wall portion 186 lying on a second cylindrical envelope extending parallel to the adjusting bore axis B. The concave trailing wall portion 186 of the wedge recess 178 and the convex trailing surface portion 168 of the adjusting wedge 150 match in shape and dimensions. The wedge recess base 180 and the pocket base 172 define therebetween an acute wedge recess angle ρ. In accordance with the particular embodiment, the adjusting angle α and the wedge recess angle ρ are identical, and equal to the wedge intermediate angle ω.

With reference to FIG. 18, each adjusting wedge 150 is associated with an adjusting member 188. Each adjusting member 188 is of a generally cylindrical shape having a member top portion 190 and a member bottom portion 192 separated by a member circumferential slot. The member bottom portion 192 is formed with an external right-handed thread. The member top portion 190 is formed with an external left-handed thread and terminates at a member top face 338 having an adjusting socket 340 centrally disposed therein and designed to receive a key (not shown). The key, and the corresponding adjusting socket 340, may be of any appropriate design.

Figure 25:
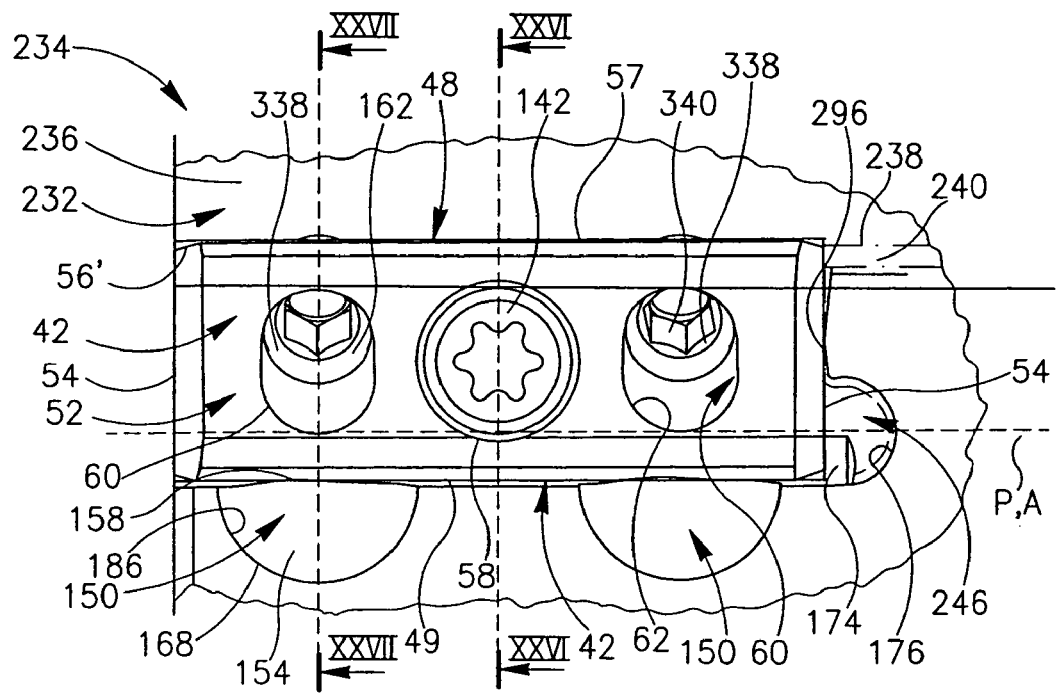
FIG. 25 is a detail view the reamer shown in FIG. 17, showing a top view of the major face of the cutting insert.
Figure 26:
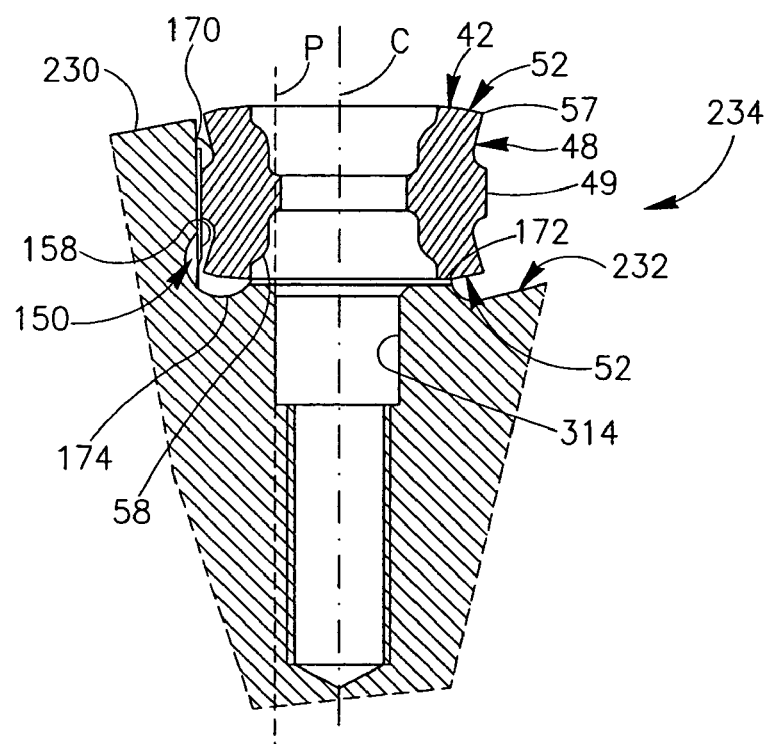
FIG. 26 is a cross-sectional view taken along the line XXVI-XXVI in FIG. 25.

Attention is now drawn to FIGS. 25 and 26. To secure the cutting insert 42 in the reamer 220 of the second embodiment, the member top portion 190 is threaded into the wedge adjusting through-hole 164 of the associated adjusting wedge 150, from the wedge bottom 152, by turning the adjusting member 188 counter-clockwise relative to the adjusting wedge 150 when looking at the wedge bottom 152. The adjusting wedge 150 is placed in the wedge recess 178 with the trailing surface portion 168 of the adjusting wedge 150 abutting the trailing wall portion 186 of the wedge recess 178. The member bottom portion 192 is threaded into the wedge recess adjusting bore 184 by inserting the key to the adjusting socket 340 and threading the adjusting member 188 clockwise when looking from the direction of the adjusting member top face 338, until the wedge intermediate surface 162 is positioned radially inwardly relative to the pocket base 172. The cutting insert 42 is positioned in the insert pocket 246 with a radially innermost insert major face 52 abutting the pocket base 172, and with the abutting surface 49 of tangentially trailing insert end face 48 abutting the two wedge support walls 158 and an axially rearwardly-disposed insert minor face 54 abutting the axial support wall 296. The cutting insert 42 is secured by inserting the clamping screw 142, which is identical to the clamping screw 142 if the reamer 20 of the first embodiment, through the insert clamping hole 58 and tightening it in the clamping bore 314. When secured in the insert pocket, the cutting insert 42 overlies the wedge intermediate surfaces 162 of the adjusting wedges 150 in the radial direction, and the adjusting apertures 62 of the cutting insert 42 at least partially overlap the wedge adjusting through-holes 164, so that each adjusting member top face 338 and the adjusting socket 340 formed therein are visible and accessible through the associated adjusting aperture 62.

Figure 27:
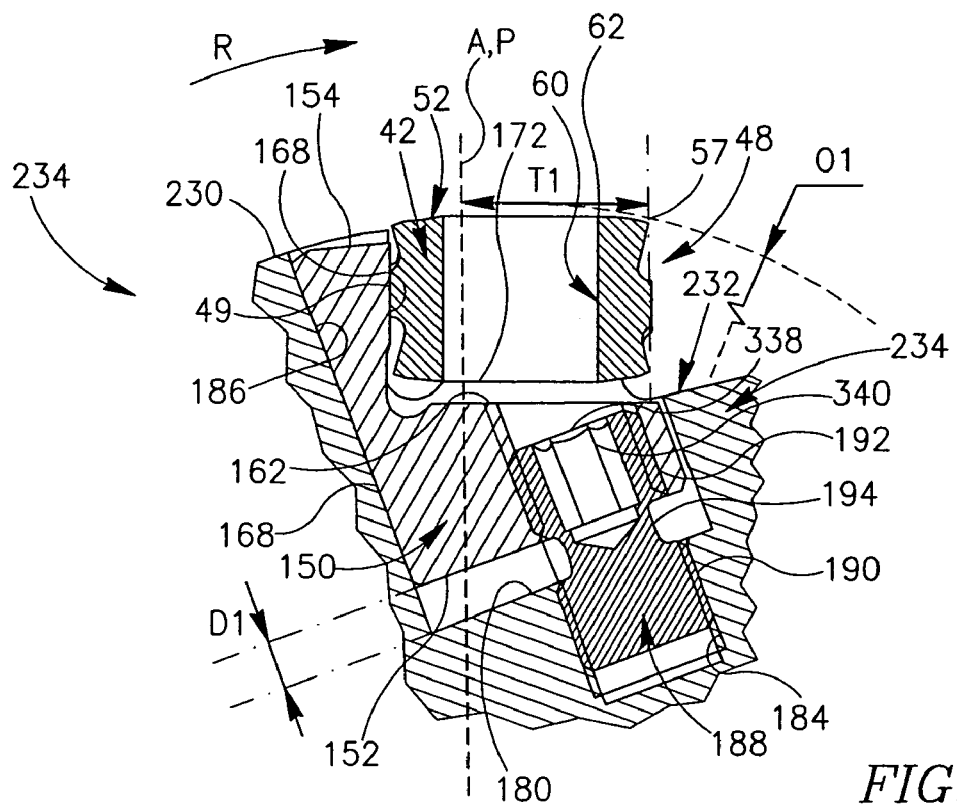
FIG. 27 is a cross-sectional view taken along the line XXVII-XXVII in FIG. 25, showing the cutting insert in an insert first position.

Referring now to FIG. 27, the cutting insert 42 is initially positioned in the reamer 220 in an insert first tangential position with the adjusting wedges 150 in a wedge radially-outermost position, in which the wedge bottom 152 is distanced from the wedge recess base 188 a first wedge distance $D_1$. In the insert first tangential position, a tangentially leading end face 48 of the cutting insert 42 is positioned at a first tangential distance $T_1$ forwardly of a radial plane P extending through the axis of rotation A perpendicularly to the pocket base 172 and the tangentially-leading, radially outermost major edge 57 is positioned at the first radial distance $O_1$ from the axis of rotation A.

Figure 28:
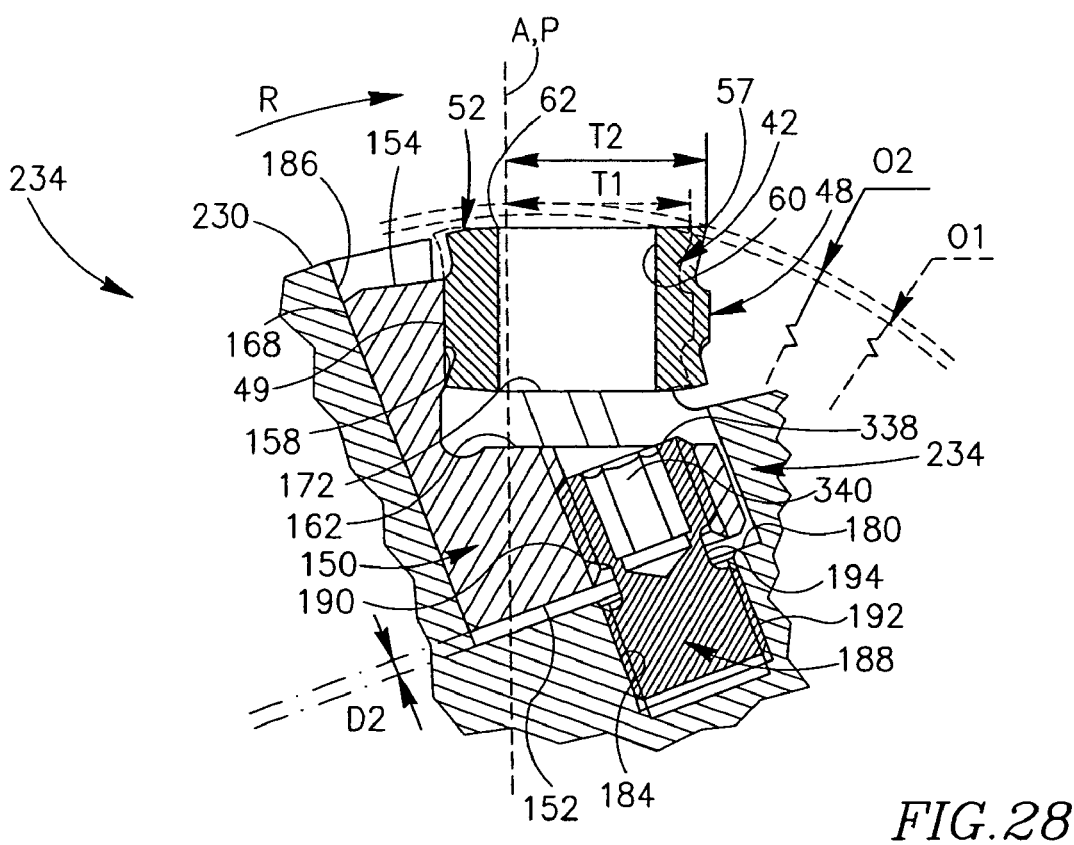
FIG. 28 is the cross sectional view taken along the line XXVII-XXVII in FIG. 25, showing the cutting insert in an insert second position.

The position of the cutting insert 42 can be continuously adjusted between the insert first tangential position and an insert second tangential position, towards which the cutting insert 42 may be brought by inserting the key through the adjusting slot 60 of the cutting insert 42 into the adjusting socket 340 of the respective adjusting member 188 of the adjusting mechanism 244 and rotating the key clockwise. The clockwise rotation of the key and consequently of the adjusting member 188 threads the member bottom portion 192 further inwardly in the wedge recess adjusting bore 184 while bringing the adjusting wedge 150 further inwardly in the wedge recess 178 as it threads inwardly on the member top portion 190. As best shown in FIG. 28, in the insert second tangential position, each adjusting wedge 150 is brought to a wedge inward position, in which the wedge bottom 152 is distanced from the wedge recess base 188 a second wedge distance $D_2$ which is smaller than the first wedge distance $D_1$. The tangentially-leading end face 48 is positioned at a second tangential distance $T_2$ forwardly of the radial plane P which is greater than the first tangential distance $T_1$, and the radially outermost major edge 57 of the tangentially-leading end face 48 is positioned at a second radial distance $O_2$ from the axis of rotation A, which is greater than the first radial distance $O_1$.

The present invention facilitates increasing the number of cutting inserts positioned on the cutting portion peripheral surface of a given tool having given diameter, while simultaneously providing for precise positioning of each cutting insert at the same cutting diameter, by associating each cutting insert with a dedicated adjusting mechanism positioned radially inwardly relative thereto and accessible therethrough. By providing for insert adjustment through the cutting insert, the cutting inserts can be positioned close to each other, thereby increasing the number of cutting inserts which can be employed in the given tool, thus contributing to better productivity while maintaining precise positioning accuracy and repeatability of the cutting inserts.

Although the present invention has been described to a certain degree of particularity, it should be understood that various alterations and modifications could be made without departing from the scope of the invention as hereinafter claimed.

The invention claimed is:

1. A metal cutting tool comprising at least one insert pocket having a cutting insert removably secured therein in communication with an adjusting mechanism;
the cutting insert comprising at least one insert adjusting slot extending between two opposing major faces and opening out to each major face at an adjusting aperture;
the adjusting mechanism comprising at least one adjusting member having an adjusting member top face; wherein:
in a major face view of the cutting insert, the adjusting aperture of each insert major face at least partially overlaps the adjusting member top face;
a tangentially-leading, radially-outermost major edge of the cutting insert is continuously positionable between a first radial position and a second radial position;
in the first radial position, the tangentially-leading radially-outermost major edge is positioned at a first radial distance ($O_1$) from the axis of rotation of the cutting tool and
in the second radial position, the tangentially-leading radially-outermost major edge is positioned at a second radial distance ($O_2$) from the axis of rotation of the cutting tool, the second radial distance ($O_2$) being greater than the first radial distance ($O_1$).

2. A metal cutting tool comprising at least one insert pocket having a cutting insert removably secured therein in communication with an adjusting mechanism;
the cutting insert comprising:
at least one insert adjusting slot extending between two opposing major faces and opening out to each major face at an adjusting aperture; and
two opposing end faces, each end face extending between two major edges formed at the intersection thereof with the two opposing major faces and comprising an abutment surface extending between the major edges;
the adjusting mechanism comprising:
at least one adjusting member having an adjusting member top face:
wherein:
in a major face view of the cutting insert, the adjusting aperture of each insert major face at least partially overlaps the adjusting member top face;
a tangentially-leading, radially-outermost major edge of the cutting insert is continuously positionable between a first radial position and a second radial position;
in the first radial position, the tangentially-leading radially-outermost major edge is positioned at a first radial distance (O1) from the axis of rotation of the cutting tool; and
in the second radial position, the tangentially-leading radially-outermost major edge is positioned at a second radial distance (O2) from the axis of rotation of the cutting tool, the second radial distance (O2) being greater than the first radial distance (O1).

3. The metal cutting tool according to claim 2, wherein the cutting insert overlies the adjusting member top face.

4. The metal cutting tool according to claim 2, wherein the tangentially-leading radially-outermost major edge is positioned by inserting a key into an adjusting socket formed in the adjusting member top face and turning the at least one adjusting member of the adjusting mechanism.

5. The metal cutting tool according to claim 4, wherein the adjusting mechanism comprises an adjusting plate having a plate top face, a plate bottom face, and a plate peripheral face extending therebetween transversely to the plate bottom face and comprising at least one plate adjusting slot extending between and opening out to the plate bottom face and the plate top face, the plate top face and the plate bottom face forming an acute wedge plate angle ($\phi$) therebetween.

6. The metal cutting tool according to claim 5, wherein the wedge plate angle ($\phi$) is less than 45°.

7. The metal cutting tool according to claim 6, wherein the wedge plate angle ($\phi$) is 15°.

8. The metal cutting tool according to claim 4, wherein the adjusting plate comprises a plate clamping slot extending between the plate top face and the plate bottom face.

9. The metal cutting tool according to claim 4, wherein a radially-innermost major face of the cutting insert abuts the plate top face.

10. The metal cutting tool according to claim 4, wherein the plate bottom face abuts a recess base of a plate recess formed in a pocket base of the insert pocket.

11. The metal cutting tool according to claim 4, wherein the adjusting plate is adjustably positioned parallel to the plate recess base by adjustably positioning the at least one adjusting member in an adjusting bore extending inwardly from the plate recess base perpendicularly thereto.

12. A metal cutting tool comprising at least one insert pocket having a cutting insert removably secured therein in communication with an adjusting mechanism;
the cutting insert comprising at least one insert adjusting slot extending between two opposing major faces and opening out to each major face at an adjusting aperture;
the adjusting mechanism comprising at least one adjusting member having an adjusting member top face; wherein:
in a major face view of the cutting insert, the adjusting aperture of each insert major face at least partially overlaps the adjusting member top face; and
the adjusting mechanism comprises at least one adjusting wedge having a wedge bottom and a wedge peripheral surface extending perpendicularly thereto, the wedge peripheral surface comprising a leading surface portion extending from the wedge bottom to a wedge intermediate surface and a back surface portion extending between the wedge bottom and a wedge top, the wedge intermediate surface and the wedge bottom forming an acute internal wedge intermediate angle ($\phi$) therebetween.

13. The metal cutting tool according to claim 12, wherein the wedge intermediate angle ($\phi$) is less than 45°.

14. The metal cutting tool according to claim 13, wherein the wedge intermediate angle is 20°.

15. The metal cutting tool according to claim 12, wherein a wedge support wall extends from the wedge top towards the wedge intermediate surface perpendicularly thereto.

16. The metal cutting tool according to claim 12, wherein a threaded wedge adjusting through-hole extends along a wedge-hole axis H perpendicularly from the wedge bottom to the wedge intermediate surface and has a threaded member top portion of the adjusting member engaged therein.

17. The metal cutting tool according to claim 16, wherein the at least one adjusting wedge is located in a wedge recess extending inwardly from a pocket base of the insert pocket, a wedge recess base comprises a threaded wedge recess adjusting bore having an adjusting bore axis B extending inwardly from the wedge recess base perpendicularly thereto.

18. The metal cutting tool according to claim 17, wherein a member bottom portion of the adjusting member is threaded into the wedge recess adjusting bore, and the at least one adjusting wedge is adjustably positioned relative to a wedge recess base of the wedge recess by rotating the at least one adjusting member.

19. A cutting insert comprising two opposing insert end faces and an insert peripheral face extending therebetween, the insert peripheral face comprising two opposing insert major faces extending transversely between the insert end faces, the cutting insert having an insert clamping hole extending between the two opposing insert major faces and disposed between two insert adjusting slots extending between the two insert major faces, wherein the cutting insert has 180° rotational symmetry about the insert clamping hole.

20. A cutting insert comprising two opposing insert end faces and an insert peripheral face extending therebetween, the insert peripheral face comprising two opposing insert major faces extending transversely between the insert end faces, the cutting insert having an insert clamping hole extending between the two opposing insert major faces and disposed between two insert adjusting slots extending between the two insert major faces, wherein:

each insert adjusting slot forms an adjusting aperture at the junction thereof with each insert major face, each adjusting aperture having a length dimension L taken perpendicularly to the insert end faces and a width dimension W taken perpendicularly to the length dimension L, the length dimension L being greater than the width dimension W.

21. A method of adjusting a position of a cutting insert removably secured in a metal cutting tool, the method comprising the steps of:

providing an adjusting mechanism comprising at least one adjusting member having an adjusting member top face, with an adjusting socket designed to receive a key formed therein;

providing the cutting insert with at least one insert adjusting slot extending between , and opening out to, two opposing insert major faces at an adjusting aperture;

securing the cutting insert in the cutting tool so that the at least one adjusting member top face and the adjusting aperture of each insert major face at least partially overlap, in a major face view of the cutting insert;

inserting the key through the insert adjusting slot to the adjusting socket; and rotating the key;

whereby the position of the cutting insert relative to the cutting tool is adjusted.

* * * * *